(12) United States Patent
Lee et al.

(10) Patent No.: US 10,115,950 B2
(45) Date of Patent: Oct. 30, 2018

(54) METHOD OF PREPARING SEPARATOR FOR LITHIUM SECONDARY BATTERY, SEPARATOR PREPARED THEREFROM, AND LITHIUM SECONDARY BATTERY COMPRISING THE SAME

(71) Applicant: LG Chem, Ltd., Seoul (KR)

(72) Inventors: Joo-Sung Lee, Daejeon (KR); Sun-Mi Jin, Daejeon (KR); Da-Kyung Han, Daejeon (KR); Ji-Eun Kim, Daejeon (KR); Kyung-Ryun Ka, Daejeon (KR)

(73) Assignee: LG Chem, Ltd. (KR)

( * ) Notice: Subject to any disclaimer, the term of this patent is extended or adjusted under 35 U.S.C. 154(b) by 635 days.

(21) Appl. No.: 14/433,094

(22) PCT Filed: Sep. 30, 2014

(86) PCT No.: PCT/KR2014/009212
§ 371 (c)(1),
(2) Date: Apr. 2, 2015

(87) PCT Pub. No.: WO2015/047034
PCT Pub. Date: Apr. 2, 2015

(65) Prior Publication Data
US 2015/0263324 A1 Sep. 17, 2015

(30) Foreign Application Priority Data
Sep. 30, 2013 (KR) .......................... 10-2013-0116745
Sep. 29, 2014 (KR) .......................... 10-2014-0130571

(51) Int. Cl.
| | | |
|---|---|---|
| *H01M 2/16* | (2006.01) | |
| *H01M 2/18* | (2006.01) | |
| *H01M 10/0525* | (2010.01) | |
| *H01M 10/0567* | (2010.01) | |
| *H01M 2/14* | (2006.01) | |
| *H01M 10/052* | (2010.01) | |
| *H01M 10/0569* | (2010.01) | |
| *H01M 10/0568* | (2010.01) | |

(52) U.S. Cl.
CPC ......... *H01M 2/1686* (2013.01); *H01M 2/145* (2013.01); *H01M 2/166* (2013.01); *H01M 2/1646* (2013.01); *H01M 2/1653* (2013.01); *H01M 10/0525* (2013.01); *H01M 10/0567* (2013.01); *H01M 10/052* (2013.01); *H01M 10/0568* (2013.01); *H01M 10/0569* (2013.01); *H01M 2300/0034* (2013.01)

(58) Field of Classification Search
None
See application file for complete search history.

(56) References Cited

U.S. PATENT DOCUMENTS

| | | | | |
|---|---|---|---|---|
| 2006/0099497 A1* | 5/2006 | Uetani | ...................... | B32B 5/18 429/144 |
| 2009/0111025 A1* | 4/2009 | Lee | ....................... | H01M 2/166 429/251 |
| 2009/0111026 A1 | 4/2009 | Kim et al. | | |
| 2010/0323230 A1 | 12/2010 | Lee et al. | | |
| 2011/0159347 A1* | 6/2011 | Shibano | .............. | H01M 2/1646 429/144 |
| 2011/0259505 A1* | 10/2011 | Lee | ....................... | H01M 2/145 156/78 |
| 2013/0260208 A1 | 10/2013 | Cho et al. | | |
| 2013/0316219 A1 | 11/2013 | Ha et al. | | |
| 2014/0287327 A1 | 9/2014 | Lee et al. | | |

FOREIGN PATENT DOCUMENTS

| | | |
|---|---|---|
| EP | 0982790 A1 | 3/2000 |
| EP | 2819232 A1 | 12/2014 |
| JP | 2002015773 A | 1/2002 |
| JP | 2007048738 A | 2/2007 |
| JP | 2011512005 | 4/2011 |
| KR | 100646508 B1 | 11/2006 |
| KR | 101312431 B1 | 9/2013 |
| KR | 20130101459 A | 9/2013 |
| TW | 201246661 A | 11/2012 |
| WO | 9931751 A1 | 6/1999 |
| WO | 2013100519 A1 | 7/2013 |

OTHER PUBLICATIONS

Hattori, Adv. Mater. 2001, 13, No. 1, Jan. 5, 51-54.*
Partial Search Report from European Application No. 14848353.0, dated Apr. 28, 2016.
Extended Search Report from European Application No. 14848353.0, dated Aug. 10, 2016.
International Search Report for Application No. PCT/KR2014/009212 dated Jan. 28, 2015.

* cited by examiner

*Primary Examiner* — Eli S Mekhlin
(74) *Attorney, Agent, or Firm* — Lerner, David, Littenberg, Krumholz & Mentlik, LLP

(57) ABSTRACT

The present disclosure provides a method of preparing a separator for a lithium secondary battery, comprising: (S1) bringing polymer particles into electric charging to obtain electrically charged polymer particles; (S2) transferring the electrically charged polymer particles on at least one surface of a porous polymer substrate to form an electrode-adhesion layer whose area ranges from 1 to 30% based on the total area of the porous polymer substrate; and (S3) fixing the electrode-adhesion layer with heat and pressure. In accordance with the present disclosure, an electrode-adhesion layer is applied by using electrostatic charging, more specifically coating polymer particles by way of laser printing, without the addition of a slurry in a solvent, thereby allowing easy handling and storage and needs no drying step of the solvent to provide cost savings effect as well as rapid and efficient preparation of the separator.

19 Claims, No Drawings

METHOD OF PREPARING SEPARATOR FOR LITHIUM SECONDARY BATTERY, SEPARATOR PREPARED THEREFROM, AND LITHIUM SECONDARY BATTERY COMPRISING THE SAME

CROSS-REFERENCE TO RELATED APPLICATION

This application is a national phase entry under 35 U.S.C. § 371 of International Application No. PCT/KR2014/009212, filed Sep. 30, 2014, which claims priority to Korean Patent Application No. 10-2013-0116745, filed Sep. 30, 2013 and Korean Patent Application No. 10-2014-0130571, filed Sep. 29, 2014, the disclosures of which are incorporated herein by reference.

TECHNICAL FIELD

The present disclosure relates to a method of preparing a separator for a lithium secondary battery, more particularly to a method of preparing a separator which comprises forming an electrode-adhesion layer on the surface thereof by way of laser printing without using a solvent, thereby allowing easy handling and storage to provide cost savings effect; a separator prepared therefrom; and a lithium secondary battery comprising the separator.

BACKGROUND ART

Recently, there has been an increasing interest in energy storage technology. As the application fields of energy storage technologies have been extended to cellular phones, camcorders, notebook computers, PCs and electric cars, efforts have been increasingly been made towards the research and development of electrochemical devices. In this regard, electrochemical devices are one of the subjects of great interest. Particularly, development of rechargeable secondary batteries has been the focus of attention. Recently, extensive research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries.

Generally, lithium secondary batteries consist of an anode comprising an anode active material layer, a cathode comprising a cathode active material, a separator interposed between the anode and the cathode to electrically insulate them, and a non-aqueous electrolyte solution comprising an electrolyte salt and an organic solvent.

Among these, the separator should generally satisfy the requirements of safety and heat resistance to the components of batteries, high electrolytic conductivity, and sufficient strength which can maintain its original form during its preparation, processing and application in batteries for preventing contact between both electrodes. As such a separator, a polyolefin-based porous substrate having multiple fine pores has been conventionally used.

Meanwhile, the separator may have a layer for adhesion with electrodes on the surface thereof for the purpose of improving adhesion of the separator with electrodes or preventing early meltdown and shutdown of the separator during overcharging. Conventional separators applying such an electrode-adhesion layer have been prepared by coating a polymer slurry in a solvent on a porous polymer substrate, followed by drying. In the slurry used in coating, the solvent is for obtaining flexibility as well as proper dispersion and viscosity of polymer particles.

However, the use of such a solvent incurs costs which may also increase depending on the needs of the solvent, and in the case the solvent is harmful to the human body, there may be additional costs in handling and storage, and also a production yield may decrease since the solvent requires drying after coating.

DISCLOSURE

Technical Problem

The present disclosure is designed to solve the above-mentioned problems, and therefore the present disclosure is directed to providing a method of preparing a separator for a lithium secondary battery by forming an electrode-adhesion layer in the form of patterns favorable to transfer lithium ions without a solvent, which allows easy handling and storage and needs no drying step of the solvent after coating to provide cost savings effect and efficient productivity due to a quick coating procedure, as well as a separator prepared therefrom, and a lithium secondary battery comprising the separator.

Technical Solution

In accordance with one aspect of the present disclosure, there is provided a method of preparing a separator for a lithium secondary battery, comprising: (S1) bringing polymer particles into electric charging to obtain electrically charged polymer particles; (S2) transferring the electrically charged polymer particles on at least one surface of a porous polymer substrate to form an electrode-adhesion layer whose area ranges from 1 to 30% based on the total area of the porous polymer substrate; and (S3) fixing the electrode-adhesion layer with heat and pressure.

In the present disclosure, the porous polymer substrate may be made of any one selected from the group consisting of high-density polyethylene, low-density polyethylene, linear low-density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate, and a mixture thereof.

The polymer particles may be selected from the group consisting of polyvinylidene fluoride-co-hexafluoropropylene (PVDF-HFP), polyvinylidene fluoride-co-chlorotrifluoroethylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, alginate, carboxyl methyl cellulose and a mixture thereof.

The electrode-adhesion layer may have a thickness of 0.001 to 5 µm.

Also, the electrode-adhesion layer may be formed in at least one selected from line, wave, cross and random patterns.

In addition, the electrode-adhesion layer may be formed on each of both surfaces of the porous polymer substrate, and the electrode-adhesion layers formed may each have patterns being asymmetric to each other.

Further, the electrode-adhesion layer may be formed on each of both surfaces of the porous polymer substrate by applying the polymer particles in different amounts.

Meanwhile, the fixing step may be carried out at a temperature of 60 to 180° C. and a pressure of 1 to 300 kgf/cm$^2$.

Also, the present disclosure provides a method of preparing a separator for a lithium secondary battery, comprising: (S1) forming a porous coating layer comprising inorganic particles on at least one surface of a porous polymer substrate; (S2) bringing polymer particles into electric charging to obtain electrically charged polymer particles; (S3) transferring the electrically charged polymer particles on the porous coating layer to form an electrode-adhesion layer whose area ranges from 1 to 30% based on the total area of the porous coating layer; and (S4) fixing the electrode-adhesion layer with heat and pressure.

In the present disclosure, the inorganic particles may be selected from the group consisting of inorganic particles having a dielectric constant of 5 or higher, inorganic particles having the ability to transport lithium ions, or a mixture thereof.

Examples of the inorganic particles having a dielectric constant of 5 or higher include $SrTiO_3$, $SnO_2$, $CeO_2$, $MgO$, $NiO$, $CaO$, $ZnO$, $ZrO_2$, $SiO_2$, $Y_2O_3$, $Al_2O_3$, $AlOOH$, $Al(OH)_3$, $TiO_2$, $SiC$, $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3} Nb_{2/3})O_3$-$xPbTiO_3$ (PMN-PT, $0<x<1$), $HfO_2$ inorganic particles and a mixture thereof.

Also, examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof.

The inorganic particles may have an average diameter of 0.001 to 100 μm.

The may have a thickness of 1 to 100 μm.

Also, the porous coating layer may be formed on each of both surfaces of the porous polymer substrate and the electrode-adhesion layer may be formed on each of the porous coating layers, and the electrode-adhesion layers formed may each have patterns being asymmetric to each other.

In addition, the porous coating layer may be formed on each of both surfaces of the porous polymer substrate and the electrode-adhesion layer may be formed on each of the porous coating layers by applying the polymer particles in different amounts.

Meanwhile, the fixing step may be carried out at a temperature of 60 to 180° C. and a pressure of 1 to 300 kgf/cm$^2$.

In accordance with another aspect of the present disclosure, there is provided a separator for a lithium secondary battery, prepared by the above method.

Also, the present disclosure provides a separator for a lithium secondary battery, comprising a porous polymer substrate; and an electrode-adhesion layer formed from polymer particles on at least one surface of the porous polymer substrate and having an area ranging from 1 to 30% based on the total area of the porous polymer substrate.

In addition, the present disclosure provides a separator for a lithium secondary battery, comprising a porous polymer substrate; a porous coating layer formed on at least one surface of the porous polymer substrate and comprising inorganic particles; and an electrode-adhesion layer formed from polymer particles on the porous coating layer and having an area ranging from 1 to 30% based on the total area of the porous coating layer.

Further, in accordance with still another aspect of the present disclosure, there is provided a lithium secondary battery comprising a cathode, an anode, a separator interposed between the cathode and the anode and a non-aqueous electrolyte solution, wherein the separator is defined in the present disclosure.

In the present disclosure, the non-aqueous electrolyte solution may comprise an organic solvent and an electrolyte salt.

The organic solvent may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, fluoroethylene carbonate (FEC), dimethyl carbonate (DMC), diethyl carbonate (DEC), dipropyl carbonate, ethyl methyl carbonate (EMC), methyl propyl carbonate, ethyl propyl carbonate, methyl acetate, ethyl acetate, propyl acetate, methyl propionate, ethyl propionate, propyl propionate, γ-butyrolactone, γ-valerolactone, γ-caprolactone, σ-valerolactone, ε-caprolactone and a mixture thereof.

The electrolyte salt may comprise an anion selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$ and a mixture thereof.

Advantageous Effects

According to the present disclosure, in the preparation of a separator for a lithium secondary battery, an electrode-adhesion layer is applied by using electrostatic charging, more specifically applying polymer particles by way of laser printing, without the application of a slurry in a solvent, thereby allowing easy handling and storage and needs no drying step of the solvent to provide cost savings effect as well as rapid and efficient preparation of the separator.

Further, the electrode-adhesion layer is applied in a certain area, not the whole area in the separator, thereby preventing an excessive resistance rise in a lithium secondary battery using the separator.

BEST MODE

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Accordingly, the embodiments proposed herein are just a preferable example for the purpose of illustrations only, not intended to limit the scope of the disclosure, so it should be understood that other equivalents and modifications could be made thereto without departing from the spirit and scope of the disclosure.

In accordance with one embodiment of the present disclosure, a separator for a lithium secondary battery may be prepared as follows:

Firstly, polymer particles are brought into electric charging to obtain electrically charged polymer particles (electric charging step).

The electric charging may be carried out by placing the polymer particles in a storage bath and charging them with positive or negative electric charges, e.g., by corona discharge which uses high voltage for applying electrostatic force to the polymer particles, arc discharge, or frictional electricity generation which uses the ability of substances having different properties to exchange charges when the substances come into contact with each other. However, the present disclosure is not limited thereto. By such an electric charging, the polymer particles are driven to instantaneously or continuously attach on a porous polymer substrate or a porous coating layer which will be described below.

The polymer particles used in the present disclosure may be any one selected from the group consisting of polyvinylidene fluoride-co-hexafluoropropylene (PVDF-HFP), polyvinylidene fluoride-co-chlorotrifluoroethylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, alginate, carboxyl methyl cellulose and a mixture thereof.

Subsequently, the electrically charged polymer particles are transferred on at least one surface of a porous polymer substrate to form an electrode-adhesion layer whose area ranges from 1 to 30% based on the total area of the porous polymer substrate (transferring step).

If the polymer particles are charged with positive or negative electric charges, the porous polymer substrate may be inversely charged with negative or positive electric charges. Accordingly, when the porous polymer substrate is located around the electrically charged polymer particles, the electrically charged polymer particles attach on the porous polymer substrate by electrostatic force to form the electrode-adhesion layer.

The porous substrate used in the present disclosure may be any one which is conventionally used in electrochemical devices, for example, a polyolefin-based membrane or non-woven fabric, but the present disclosure is not particularly limited thereto.

The polyolefin-based porous membrane may be obtained from a polyolefin-based polymer, for example, polyethylene such as high-density polyethylene, linear low-density polyethylene, low-density polyethylene and ultra-high molecular weight polyethylene, polypropylene, polybutylene, polypentene or a mixture thereof.

The non-woven fabric may be a polyolefin-based non-woven fabric, or a non-woven fabric made of a polymer selected from polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalate and a mixture thereof. The non-woven fabric may be a spun-bond or melt-blown fabric consisting of long fibers in structure.

The porous substrate has preferably a thickness of 5 to 50 μm, but is not particularly limited thereto. Also, the porous substrate has a pore size of 1 to 200 nm and a porosity of 10 to 95%, but is not particularly limited thereto.

In the present disclosure, the electrode-adhesion layer may have a thickness of 0.001 to 5 μm, and the electrode-adhesion layer is applied so that its area ranges from 1 to 30% based on the total area of the porous polymer substrate, not applied in the whole area, thereby preventing an excessive resistance rise in a lithium secondary battery.

If the area where the electrode-adhesion layer is formed is less than such numerical range, it is difficult to achieve good adhesion with electrodes layer due to insufficient adhesiveness. If the area exceeds such numerical range, the resistance of a lithium secondary battery may be raised on battery operation, thereby deteriorating battery performances.

Also, the electrode-adhesion layer may be formed in a pattern capable of transferring lithium ions favorably, e.g., any one selected from line, wave, cross and random patterns.

In addition, the electrode-adhesion layer may be formed on each of both surfaces of the porous polymer substrate, and in this case the patterns of the electrode-adhesion layers formed may be asymmetric to each other and the application area thereof may be different from each other, according to the natures of adhesion with electrodes.

Then, the electrode-adhesion layer is fixed on the porous polymer substrate with heat and pressure (fixing step).

For example, the electrode-adhesion layer may pass through heating and press rollers for heating and compression. This step may be carried out at a temperature of 60 to 180° C. and a pressure of 1 to 300 kgf/cm$^2$ for uniform fixing of the electrode-adhesion layer.

Meanwhile, prior to the formation of the electrode-adhesion layer, a porous coating layer comprising inorganic particles may be formed, as described below.

Firstly, a porous coating layer comprising inorganic particles is formed on at least one surface of a porous polymer substrate.

The porous polymer substrate is the same as described above.

As the inorganic particles, inorganic particles having a high dielectric constant may be used to increase a dissociation rate of an electrolyte salt, e.g., a lithium salt, in a liquid electrolyte, thereby improving an ionic conductivity of the electrolyte.

For the foregoing reasons, the inorganic particles used in the present disclosure preferably include inorganic particles having a dielectric constant of 5 or higher, preferably 10 or higher, inorganic particles having the ability to transport lithium ions, and a mixture thereof.

Non-limiting examples of the inorganic particles having a dielectric constant of 5 or higher include $SrTiO_3$, $SnO_2$, $CeO_2$, $MgO$, $NiO$, $CaO$, $ZnO$, $ZrO_2$, $SiO_2$, $Y_2O_3$, $Al_2O_3$, $AlOOH$, $Al(OH)_3$, $TiO_2$, $SiC$, $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$), $HfO_2$ inorganic particles and a mixture thereof.

Among these, inorganic particles such as $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$) and hafnia ($HfO_2$) exhibit a high dielectric characteristic of a dielectric constant of 100 or higher, as well as piezoelectricity which occurs when constant pressure is applied to induce a potential difference between both surfaces, thereby preventing the generation of internal short circuit between both electrodes due to external impact and thus further improving the safety of electrochemical devices.

Also, when a mixture of inorganic particles having a high dielectric constant and inorganic particles having the ability to transport lithium ions is used, the synergetic effect thereof can be obtained.

In the present disclosure, the inorganic particle having the ability to transport lithium ions refers to inorganic particles containing lithium atom which are capable of moving lithium ions without storing the lithium. The inorganic particle having the ability to transport lithium ions may transfer and move lithium ions due to a kind of defect existing in the particle structure, so it is possible to improve lithium ion conductivity in the battery and also improve the performance of the battery. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof.

The inorganic particles may have an average diameter of 0.001 to 100 μm, preferably 0.01 to 50 μm. When such a diameter range of the inorganic particles is satisfied, the specific surface area of the inorganic particles becomes remarkably increased to solve the problem that a binder for binding the inorganic particles is used in an excess of amounts, and also it can provide a proper thickness of the porous coating layer, a proper pore size between the inorganic particles and a proper porosity.

Also, the porous coating layer may have a thickness of 1 to 100 μm, preferably 1 to 40 μm, more preferably 2 to 15 μm.

When such a thickness range of the porous coating layer is satisfied, an additional transferring path of lithium ions can be further added and the impregnation of an electrolyte solution can improve to enhance the performances and thermal safety of batteries.

Subsequently, polymer particles are brought into electric charging to obtain electrically charged polymer particles (electric charging step).

The polymer particles to be used and the electric charging process are the same as described above.

Then, the electrically charged polymer particles are transferred into the porous coating layer to form an electrode-adhesion layer so that the area of the electrode-adhesion layer ranges from 1 to 30% based on the total area of the porous coating layer (transferring step).

If the polymer particles are charged with positive or negative electric charges, the porous coating layer may be inversely charged with negative or positive electric charges. Accordingly, when the porous coating layer is located around the electrically charged polymer particles, the electrically charged polymer particles attach on the porous coating layer by electrostatic force to form the electrode-adhesion layer.

Such an electrode-adhesion layer may have a thickness of 0.001 to 5 μm, and the electrode-adhesion layer is applied so that its area ranges from 1 to 30% based on the total area of the porous coating layer, not applied in the whole area, thereby preventing an excessive resistance rise in a lithium secondary battery.

Also, the electrode-adhesion layer may be formed in a pattern capable of transferring lithium ions favorably, e.g., any one selected from line, wave, cross and random patterns.

In addition, when the porous coating layer may be formed on each of both surfaces of the porous polymer substrate, the electrode-adhesion layer may be formed on each of the porous coating layers. In this case, the patterns of the electrode-adhesion layers formed may be asymmetric to each other and the application area thereof may be different from each other, according to the natures of adhesion with electrodes.

Then, the electrode-adhesion layer is fixed on the porous coating layer with heat and pressure (fixing step).

For example, the electrode-adhesion layer may pass through heating and press rollers for heating and compression. This step may be carried out at a temperature of 60 to 180° C. and a pressure of 1 to 300 kgf/cm² for uniform fixing of the electrode-adhesion layer.

Also, the present disclosure provides a lithium secondary battery comprising a cathode, an anode, a separator interposed between the cathode and the anode and a non-aqueous electrolyte solution, the separator being prepared by the above-mentioned method of the present disclosure.

In the lithium secondary battery according to one embodiment of the present disclosure, the electrodes are not particularly limited, and may be manufactured by binding an electrode active material to an electrode current collector according to a conventional method known in the art.

As active materials used in each electrode, a cathode active material may be any of those that are commonly used in cathodes of conventional electrochemical devices. Non-limiting examples of the cathode active material include lithium manganese oxides, lithium cobalt oxides, lithium nickel oxides, lithium iron oxides, and lithium composite oxides thereof.

Also, an anode active material may be any of those that are commonly used in anodes of conventional electrochemical devices. Non-limiting examples of the anode active material include lithium, lithium alloys, and lithium intercalation materials such as carbon, petroleum coke, activated carbon, graphite and other carbonaceous materials.

Non-limiting examples of a cathode current collector include aluminum foils, nickel foils and a combination thereof. Non-limiting examples of an anode current collector include copper foils, gold foils, nickel foils, copper alloy foils and a combination thereof.

The non-aqueous electrolyte solution may comprise an organic solvent and an electrolyte salt, i.e., a lithium salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$ and a mixture thereof.

The organic solvent used in the non-aqueous electrolyte solution may be one which is conventionally used in an electrolyte solution for a lithium secondary battery. For example, an ether, an ester, an amide, a linear carbonate and a cyclic carbonate may be used alone or as a mixture of two or more.

Among these, a linear carbonate, a cyclic carbonate, or a mixture thereof is representatively used.

The cyclic carbonate compound may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, a halide thereof and a mixture thereof. Examples of the halide include fluoroethylene carbonate (FEC) and the like, but are not limited thereto.

The linear carbonate compound may be any one selected from the group consisting of dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto.

In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto.

In addition, the ester which may be used as the organic solvent is any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone and a mixture thereof, but is not limited thereto.

The electrolyte solution may be introduced in any suitable step during the manufacturing of the electrochemical device depending on the manufacturing processes and desired physical properties of a final product. Specifically, the electrolyte may be introduced before assembling a battery or in the final step of the assembling.

In the lithium secondary battery of the present disclosure, the separator and electrodes may be processed by lamination or stack of a separator and electrodes, and folding. Also, in the present disclosure, the lithium secondary battery is not particularly limited to its form. For example, the lithium secondary battery may be prepared in a cylindrical form such as a can, a prismatic form, a pouch form, or a coin form.

Hereinafter, preferred examples of the present disclosure will be described in detail for better understanding. However, the examples of the present disclosure may be modified in various ways, and they should not be interpreted as limiting the scope of the invention. The examples of the present disclosure are just for better understanding of the invention to persons having ordinary skill in the art.

1. Preparation of Electrode Assembly (1) Example 1

In order to form an electrode-adhesion layer, PVdF-HFP (Kynar2751, Arkema) and silica nanoparticles (Aerosil R805, Degusa) were mixed in a weight ratio of 98:2 using the Henschel mixer for 5 minutes to obtain powders for forming an electrode-adhesion layer with fluidity, and the powders were put in a drum.

Subsequently, the powders obtained were subject to selective printing (4% of the whole area) on the edge of a 12 μm-thick porous polyolefin substrate (F12BMS, Toray) in a width of 2 mm by way of laser printing, followed by lamination with a NMC-based cathode at 70° C. and 90 kgf/cm$^2$.

Similarly, the same pattern printing was carried out on the opposite surface of the porous polyolefin substrate, followed by lamination with a graphite-based anode under the same lamination conditions. Thereby, an electrode assembly was prepared.

(2) Example 2

500 nm-sized AlOOH (AOH6O, Nabaltec) as inorganic particles and AD-S01 (LG Chem.) as a dispersant were mixed in a weight ratio of 97:3 and dispersed in acetone as a solvent by way of ball-milling for 12 hours, to obtain a slurry whose solid content is about 20%.

The obtained slurry was coated on one surface of a 12 μm-thick porous polyolefin substrate (F12BMS, Toray) in a width of 4 mm, to obtain an organic/inorganic composite separator having a porous coating layer.

Then, in order to form an electrode-adhesion layer, PVdF-HFP (Kynar2751, Arkema) and silica nanoparticles (Aerosil R805, Degusa) were mixed in a weight ratio of 98:2 using the Henschel mixer for 5 minutes to obtain powders for forming an electrode-adhesion layer with fluidity, and the powders were put in a drum.

Subsequently, the powders obtained were subject to selective printing (4% of the whole area) on the edge of the porous coating layer in the organic/inorganic composite separator in a width of 2 mm by way of laser printing, followed by lamination with a NMC-based cathode at 100° C. and 100 kgf/cm$^2$.

Similarly, the same pattern printing was carried out on the opposite surface of the porous polyolefin substrate, followed by lamination with a graphite-based anode under the same lamination conditions. Thereby, an electrode assembly was prepared.

(3) Example 3

The procedures of Example 2 were repeated except that the powders for an electrode-adhesion layer were subject to selective printing (10% of the whole area) in linear patterns having a gap of 18 mm and a width of 2 mm, thereby preparing an electrode assembly.

(4) Example 4

The procedures of Example 2 were repeated except that the powders for an electrode-adhesion layer were subject to selective printing in a width of 0.5 mm on the edge of the porous coating layer being faced with the cathode and the linear pattern printing of Example 3 was carried out on the side being faced with the anode in the same manner so that the printing area becomes 5.5% of the whole area, thereby preparing an electrode assembly.

(5) Comparative Example 1

The procedures of Example 2 were repeated except that the powders for an electrode-adhesion layer were subject to selective printing (0.8% of the whole area) in a width of 0.4 mm on the edge of the porous coating layer, thereby preparing an electrode assembly.

In this case, the electrode assembly failed to proceed with the following process due to poor adhesiveness with the anode.

(6) Comparative Example 2

The procedures of Example 2 were repeated except that the powders for an electrode-adhesion layer were subject to selective printing (50% of the whole area) in linear patterns having a gap of 18 mm and a width of 2 mm, thereby preparing an electrode assembly.

2. Evaluation of Electrode Assembly for Resistance

Mono cells finally prepared by introducing an electrolyte solution were measured for their resistance, and the results thereof are shown in Table 1. It was confirmed that the mono cell using the electrode assembly of Comparative Example 2 exhibited a resistance higher than those of mono cells using the electrode assemblies of the Examples.

TABLE 1

|  | Example 1 | Example 2 | Example 3 | Example 4 | Comparative Example 2 |
|---|---|---|---|---|---|
| Resistance (mOhm) | 1.44 | 1.46 | 1.50 | 1.48 | 1.67 |

Thus, the resistance rise of the lithium secondary battery was caused in the electrode assembly of Comparative Example 2 in which an electrode-adhesion layer was formed excessively, and such a resistance rise may deteriorate battery performances.

The foregoing disclosure is given by way of illustration only, and various changes and modifications within the spirit and scope of the disclosure will become apparent to those skilled in the art from this detailed description. Accordingly, it should be understood that the Examples of the present disclosure are provided for the purpose of illustrations only and to better explain to a person having ordinary skill in the art, and is not intended to limit the scope of the present disclosure. The scope of the present to be protected should be defined by the claims, all technical spirits equivalent thereto should be interpreted to be fallen within the scope of the present disclosure.

What is claimed is:

1. A method of preparing a separator for a lithium secondary battery, comprising:
   (S1) bringing polymer particles into electric charging to obtain electrically charged polymer particles;
   (S2) transferring the electrically charged polymer particles on at least one surface of an inversely electrically charged porous polymer substrate to form an electrode-adhesion layer whose area ranges from 1 to 30% based on a total area of the porous polymer substrate; and
   (S3) fixing the electrode-adhesion layer with heat and pressure,
   wherein a solvent is not used to form the electrode-adhesion layer.

2. The method of claim 1, wherein the porous polymer substrate is selected from the group consisting of high-density polyethylene, low-density polyethylene, linear low-density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate, and a mixture thereof.

3. The method of claim 1, wherein the polymer particles are selected from the group consisting of polyvinylidene fluoride-co-hexafluoropropylene (PVDF-HFP), polyvinylidene fluoride-co-chlorotrifluoroethylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, alginate, carboxyl methyl cellulose and a mixture thereof.

4. The method of claim 1, wherein the electrode-adhesion layer has a thickness of 0.001 to 5 μm.

5. The method of claim 1, wherein the electrode-adhesion layer is formed in at least one selected from line, wave, cross and random patterns.

6. The method of claim 1, wherein the electrode-adhesion layer is formed on each of both surfaces of the porous polymer substrate, and the electrode-adhesion layers formed each have patterns being asymmetric to each other.

7. The method of claim 1, wherein the electrode-adhesion layer is formed on each of both surfaces of the porous polymer substrate by applying the polymer particles in different amounts.

8. The method of claim 1, wherein the fixing step is carried out at a temperature of 60 to 180° C. and a pressure of 1 to 300 kgf/cm$^2$.

9. A method of preparing a separator for a lithium secondary battery, comprising:
   (S1) forming a porous coating layer comprising inorganic particles on at least one surface of an electrically charged porous polymer substrate;
   (S2) bringing polymer particles into electric charging to obtain inversely electrically charged polymer particles;
   (S3) transferring the electrically charged polymer particles on the porous coating layer to form an electrode-adhesion layer whose area ranges from 1 to 30% based on a total area of the porous coating layer; and
   (S4) fixing the electrode-adhesion layer with heat and pressure,
   wherein a solvent is not used to form the electrode-adhesion layer.

10. The method of claim 9, the inorganic particles are selected from the group consisting of inorganic particles having a dielectric constant of 5 or higher, inorganic particles having the ability to transport lithium ions, or a mixture thereof.

11. The method of claim 10, wherein the inorganic particles having a dielectric constant of 5 or higher are selected from the group consisting of $SrTiO_3$, $SnO_2$, $CeO_2$, MgO, NiO, CaO, ZnO, $ZrO_2$, $SiO_2$, $Y_2O_3$, $Al_2O_3$, AlOOH, $Al(OH)_3$, $TiO_2$, SiC, $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$(PMN-PT, $0<x<1$), $HfO_2$ inorganic particles and a mixture thereof.

12. The method of claim 10, wherein the inorganic particles having the ability to transport lithium ions are selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof.

13. The method of claim 9, wherein the inorganic particles have an average diameter of 0.001 to 100 µm.

14. The method of claim 9, wherein the porous coating layer has a thickness of 1 to 100 µm.

15. The method of claim 9, wherein the electrode-adhesion layer has a thickness of 0.001 to 5 µm.

16. The method of claim 9, wherein the electrode-adhesion layer is formed in at least one selected from line, wave, cross and random patterns.

17. The method of claim 9, wherein the porous coating layer is formed on each of both surfaces of the porous polymer substrate and the electrode-adhesion layer is formed on each of the porous coating layers, and the electrode-adhesion layers formed each have patterns being asymmetric to each other.

18. The method of claim 9, wherein the porous coating layer is formed on each of both surfaces of the porous polymer substrate and the electrode-adhesion layer is formed on each of the porous coating layers by applying the polymer particles in different amounts.

19. The method of claim 9, wherein the fixing step is carried out at a temperature of 60 to 180° C. and a pressure of 1 to 300 $kgf/cm^2$.

\* \* \* \* \*